United States Patent
Choi et al.

(10) Patent No.: US 9,663,890 B2
(45) Date of Patent: May 30, 2017

(54) WASHING MACHINE AND METHOD FOR CONTROLLING THE SAME

(71) Applicant: SAMSUNG ELECTRONICS CO., LTD., Suwon-si, Gyeonggi-do (KR)

(72) Inventors: Jung Won Choi, Goyang-si (KR); Sung Mo Lee, Gunpo-si (KR); Jae Young Choi, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/813,735

(22) Filed: Jul. 30, 2015

(65) Prior Publication Data

US 2015/0337476 A1  Nov. 26, 2015

Related U.S. Application Data

(62) Division of application No. 12/458,455, filed on Jul. 13, 2009, now Pat. No. 9,127,398.

(30) Foreign Application Priority Data

Dec. 19, 2008  (KR) .................. 10-2008-0130472

(51) Int. Cl.
    *D06F 37/30*    (2006.01)
    *D06F 17/08*    (2006.01)
    *D06F 33/02*    (2006.01)

(52) U.S. Cl.
    CPC ............ *D06F 37/304* (2013.01); *D06F 17/08* (2013.01); *D06F 33/02* (2013.01); *D06F 2202/12* (2013.01); *Y02B 40/52* (2013.01)

(58) Field of Classification Search
CPC ........ D06F 33/02; D06F 37/04; D06F 37/304; D06F 2202/12; Y02B 40/52
See application file for complete search history.

(56) References Cited

U.S. PATENT DOCUMENTS

| | | | |
|---|---|---|---|
| 3,246,491 A | 4/1966 | Buss | |
| 4,631,771 A | 12/1986 | Anderson et al. | |
| 5,647,232 A | 7/1997 | Boldt et al. | |
| 2005/0210926 A1 | 9/2005 | Kwon et al. | |
| 2005/0217036 A1* | 10/2005 | Park ..................... | D06F 35/006 8/158 |

FOREIGN PATENT DOCUMENTS

| | | |
|---|---|---|
| EP | 247995 | 12/1987 |
| JP | 2007-89775 | 4/2007 |

(Continued)

OTHER PUBLICATIONS

Machine Translation of Beckord et al., EP 0247995 A1, Dec. 1987.*

(Continued)

*Primary Examiner* — David Cormier
(74) *Attorney, Agent, or Firm* — Staas & Halsey LLP (57) ABSTRACT

A washing machine includes a rotary tub; a motor to rotate the rotary tub; a velocity sensing unit to sense rotational velocity of the motor; and a controller to compare a command value of the motor with a predetermined limit value, when the rotational velocity of the motor is less than a spin-drying velocity during spin-drying, to determine whether the motor is overloaded and to control driving of the motor in response to the determination.

4 Claims, 3 Drawing Sheets

(56) References Cited

FOREIGN PATENT DOCUMENTS

| KR | 1994-0011711 | 6/1994 |
| KR | 10-1997-0021488 | 5/1997 |
| KR | 10-2001-0039503 | 5/2001 |
| KR | 10-2006-0098913 | 9/2006 |
| KR | 10-2006-0115264 | 11/2006 |
| KR | 10-2007-0001598 | 1/2007 |

OTHER PUBLICATIONS

Korean Office Action issued Mar. 26, 2015 in corresponding Korean Patent Application No. 10-2008-0130472.
U.S. Office Action issued May 3, 2012 in copending U.S. Appl. No. 12/458,455.
U.S. Office Action issued Sep. 20, 2012 in copending U.S. Appl. No. 12/458,455.
U.S. Office Action issued Dec. 17, 2014 in copending U.S. Appl. No. 12/458,455.
U.S. Notice of Allowance issued May 8, 2015 in copending U.S. Appl. No. 12/458,455.
U.S. Appl. No. 12/458,455, filed Jul. 13, 2009, Jung Won Choi, Samsung Electronics Co., Ltd.

* cited by examiner

WASHING MACHINE AND METHOD FOR CONTROLLING THE SAME

CROSS-REFERENCE TO RELATED APPLICATIONS

This application is a divisional of U.S. application Ser. No. 12/458,455 filed on Jul. 13, 2009, which claims the benefit of Korean Patent Application No. 10-2008-0130472, filed on Dec. 19, 2008 in the Korean Intellectual Property Office, the disclosures of which are incorporated herein by reference.

BACKGROUND

1. Field

Embodiments of the present invention relate to a washing machine that performs a spin-drying operation and a method for controlling the same.

2. Description of the Related Art

Generally, a washing machine is an apparatus that separates contaminants from laundry by applying energy, such as impact, to the laundry. Based on how energy is applied to the laundry, the washing machine may be classified as a pulsator washing machine, an agitator washing machine, or a drum washing machine. The pulsator washing machine performs washing using force imparted to water by rotating a disc-shaped pulsator. The agitator washing machine performs washing by rotating a blade-shaped agitator protruding upward from the center of a rotary tub in alternating directions. The drum washing machine washes laundry by dropping the laundry through the rotation of a drum such that impact is applied to the laundry.

The washing machine performs a washing operation to wash laundry with detergent-dissolved water, a soak rinsing operation to rinse the laundry with clean water, and a spin-drying operation to remove water from the laundry.

Upon completion of a washing operation or a rinsing operation, the washing machine performs drainage to discharge water from a rotary tub to the outside and rotates the rotary tub to perform a spin-drying operation. However, if a large number of bubbles are generated during the washing or rinsing operation, the bubbles are introduced into a space defined between the rotary tub and a water tub during the spin-drying operation, with the result that the rotation of the rotary tub is obstructed. Consequently, the rotational velocity of the rotary tub does not reach a spin-drying velocity, and therefore, it may not be possible to sufficiently spin-dry laundry, or the rotation of the rotary tub is stopped during the spin-drying.

Also, when the water present in the rotary tub and the water contained in the laundry are not discharged through a drainage port by the spin-drying rotation of the rotary tub during the spin-drying operation but is placed between the rotary tub and the water tub of the washing machine by a centrifugal force, or when water separated from the laundry is not discharged but is placed between the rotary tub and the water tub due to the clogging of the drainage port or the breakdown of a drainage valve, not only is a washing motor overloaded but also overcurrent is generated by the water placed between the rotary tub and the water tub of the washing machine, with the result that the washing motor burns out, and the washing machine breaks.

SUMMARY

In accordance with one aspect of the present invention, a method for controlling a washing machine includes comparing a command value of a motor with a predetermined limit value, during spin-drying, to determine whether the motor is overloaded and controlling driving of the motor in response to the determination.

The determination of whether the motor is overloaded may include determining that the motor is overloaded when the command value of the motor is not less than the limit value.

The method may further include controlling the driving of the motor to be stopped when it is determined that the motor is overloaded and determining whether a drainage error is caused based on a state in which water is discharged from a rotary tub while the driving of the motor is stopped.

The water discharge state may be determined by comparing a water level of the rotary tub with a predetermined water level.

The water discharge state may be determined by comparing time for which water in the rotary tub reaches a reference water level with a reference time.

The method may further include re-driving the motor and determining a cause of the overload based on the comparison between the command value of the motor and the limit value while the motor is re-driven and controlling the driving of the motor based on the cause of the overload.

The cause of the overload may include water filling or bubble generation.

The method may further include stopping the driving of the motor to stop the spin-drying when the cause of the overload is the bubble generation.

The controlling the driving of the motor may include continuing to drive the motor to complete the spin-drying when the cause of the overload is the water filling.

The comparing the command value with the limit value may include determining the command value of the motor when rotational velocity of the motor is less than a predetermined spin-drying velocity during the spin-drying.

In accordance with another aspect of the present invention, a method for controlling a washing machine includes stopping driving of a motor when rotational velocity of the motor does not reach a spin-drying velocity within a predetermined time during spin-drying, comparing a command value of the motor with a predetermined limit value during the driving of the motor, and controlling re-driving of the motor in response to the comparison.

The method may further include determining whether a drainage error is caused based on a state in which water is discharged from a rotary tub while the driving of the motor is stopped.

The method may further include displaying the drainage error when it is determined that the drainage error is caused.

The water discharge state may be determined by comparing a water level of the rotary tub with a predetermined water level.

The water discharge state may be determined by comparing time for which water in the rotary tub reaches a reference water level with a reference time.

The method may further include displaying water filling and re-driving the motor to complete the spin-drying when the command value of the motor is less than the limit value.

The method may further include stopping the motor to stop the spin-drying and displaying bubble generation when the command value of the motor is not less than the limit value.

The method may further include performing a rinsing operation.

In accordance with another aspect of the present invention, a method for controlling a washing machine includes determining a command value of a motor during spin-drying, determining a water level of water present in a rotary tub, not discharged outside, during the spin-drying, and controlling driving of the motor based on the command value and the water level.

The method may further include comparing the command value with a predetermined limit value and accelerating the motor to perform the spin-drying when the command value is less than the limit value.

The method may further include comparing the command value with a predetermined limit value and stopping the driving of the motor when the command value is not less than the limit value.

The method may further include comparing the water level of the rotary tub with a reference water level while the motor is stopped and determining that a drainage error is caused when the water level of the rotary tub is not less than the reference water level.

The method may further include determining that water filling or bubble generation is caused when the water level of the rotary tub is less than the reference water level.

The determining that the water filling or the bubble generation is caused may include re-driving the motor to re-determine a command value of the motor and determining that the water filling is caused when the re-determined command valued is less than the limit value.

The determining that the water filling or the bubble generation is caused may include re-driving the motor to re-determine a command value of the motor and determining that excessive bubbles are generated when the re-determined command valued is not less than the limit value.

The method may further include performing a rinsing operation when it is determined that the excessive bubbles are generated.

The method may further include re-performing spin-drying when the rinsing operation is completed and comparing the command value of the motor with the limit value, while the spin-drying is re-performed, to determine whether a rinsing operation is to be added.

The rinsing operation may be performed less than a reference number of times.

In accordance with a further aspect of the present invention, a washing machine includes a rotary tub, a motor to rotate the rotary tub, a velocity sensing unit to sense rotational velocity of the motor, and a controller to compare a command value of the motor with a predetermined limit value, when the rotational velocity of the motor is less than a spin-drying velocity during spin-drying, to determine whether the motor is overloaded and to control driving of the motor in response to the determination.

When the command value is not less than the limit value, the controller may stop the driving of the motor and determine a cause of the overload.

The washing machine may further include a water level sensing unit to sense a water level of the rotary tub, and the controller may measure time for which the water level of the rotary tub reaches a reference water level, while the motor is stopped, and compare the measured time with a reference time to determine whether the cause of the overload is a drainage error.

When the measured time is less than the reference time, the controller may re-drive the motor and re-determine a command value of the motor to determine whether the cause of the overload is water filling or bubble generation.

When the re-determined command value is not less than the limit value, the controller may determine that the cause of the overload is the bubble generation and control a rinsing operation to be performed.

The overload may be caused by water filling, excessive bubbles, or a drainage error, and the washing machine may further include a display unit to display the cause of the overload.

Additional aspects and/or advantages will be set forth in part in the description which follows and, in part, will be apparent from the description, or may be learned by practice of the invention.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION OF EMBODIMENTS

Reference will now be made in detail to the embodiments of the present invention, examples of which are illustrated in the accompanying drawings, wherein like reference numerals refer to the like elements throughout.

Figure 1:
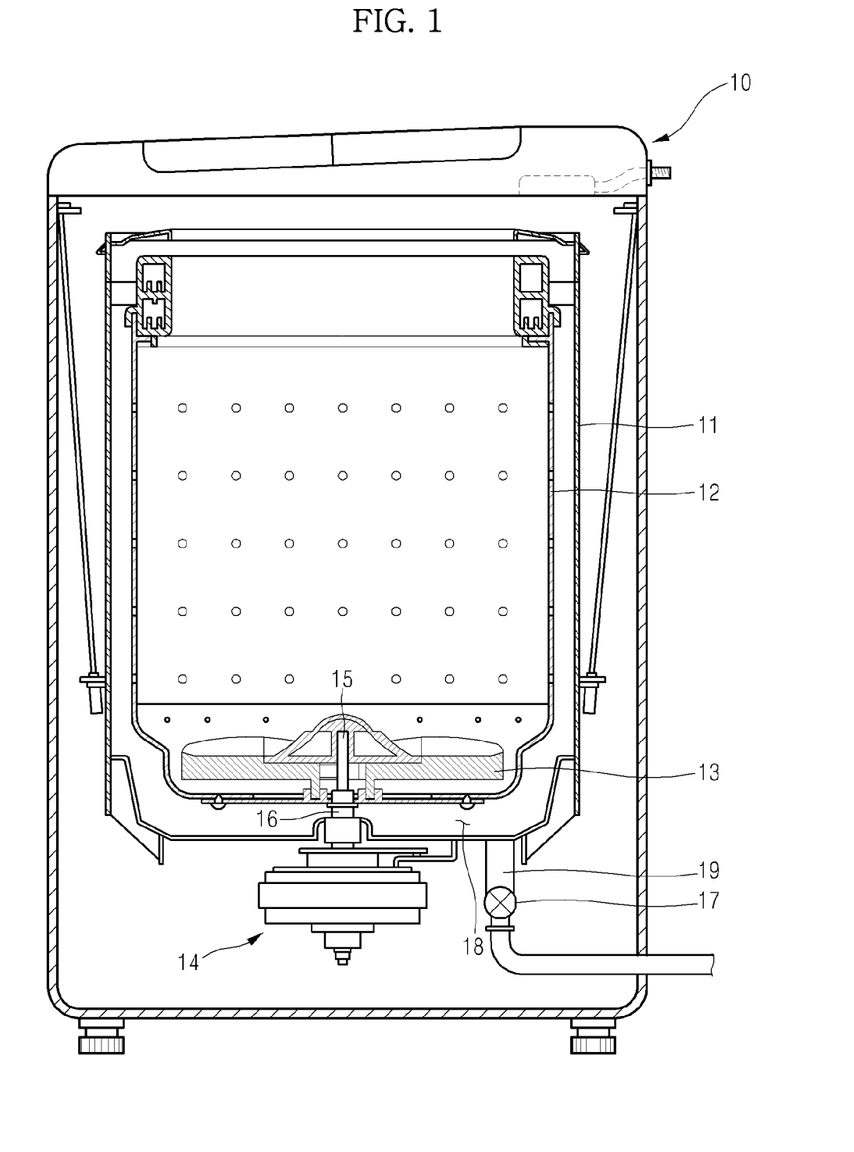
FIG. 1 is a view illustrating a washing machine according to an embodiment.

FIG. 1 is a view illustrating a washing machine 10 according to an embodiment. The washing machine 10 includes, a water tub 11 installed in a machine body forming the external appearance of the washing machine to receive water, a rotary tub 12 rotatably installed in the water tub 11, the rotary tub 12 having holes through which water flows between the water tub 11 and the rotary tub 12, and a pulsator 13 rotatably installed at the inner bottom of the rotary tub 12 to create washing water current.

The washing machine further includes a washing motor 14 to generate a rotary force, a stirring shaft 15 to rotate the pulsator 13, and a tub shaft 16 to rotate the rotary tub 12.

The stirring shaft 15 is installed in the tub shaft 16 in a freely rotatable state. The pulsator 13 is connected to the upper end of the stirring shaft 15. The washing motor 14 is connected to the lower end of the stirring shaft 15.

The stirring shaft 15 and the tub shaft 16 are rotated by a rotary force transmitted from the washing motor 14 while being engaged with each other by a clutch (not shown) or being disengaged from each other.

More specifically, the washing motor 14 rotates only the stirring shaft 15 in alternating directions, while the stirring shaft 15 and the tub shaft 16 are disengaged from each other, for the pulsator 13 to perform stirring in alternating directions, such that laundry soaking, detergent dissolution, a washing operation, a rinsing operation, and untangling of laundry are performed. Also, the washing motor 14 rotates the stirring shaft 15 and the tub shaft 16 in the forward direction or in the reverse direction, while the stirring shaft 15 and the tub shaft 16 are engaged with each other, for the pulsator 13 and the rotary tub 12 to be rotated simultaneously in one direction such that a spin-drying operation is performed.

Consequently, the washing machine 10 is operated in a direct drive fashion in which the rotational velocity of the washing motor 14 is the same as the pulsator 13 during the washing or rinsing operation and as the rotary tub 12 and the pulsator 13 during the spin-drying operation. When the direct drive fashion is applied, a brushless DC (BLDC) motor is used as the washing motor 14.

Between the water tub 11 and the rotary tub 12 is defined a space, the lower part 18 of which is connected to a drainage unit to discharge water from the water tub 11 and the rotary tub 12 to the outside. The drainage unit includes a drainage pipe 19 to guide water to the outside and a drainage valve 17 to open and close the drainage pipe 19. That is, when the drainage valve 17 is closed, the drainage pipe 19 is closed, with the result that water is stored in the water tub 11 and the rotary tub 12. When the drainage valve 17 is opened, the drainage pipe 19 is opened, with the result that water is discharged from the water tub 11 and the rotary tub 12 to the outside through the drainage pipe 19.

The washing machine 10 further includes a water supply unit (not shown) to supply water from an external water supply source to the water tub 11 and the rotary tub 12, and a detergent supply unit connected to the water supply unit, such that water is supplied from the water supply unit to the detergent supply unit, to supply detergents, such as cleanser and fabric softener, placed therein by a user, to the water tub 11 and the rotary tub 12 together with water.

Also, the washing machine 10 further includes a top cover installed at the top of the machine body, an opening formed at the top cover to allow laundry to be put into the rotary tub 12 or taken out of the rotary tub 12 therethrough, and a door to open and close the opening. At the top cover are installed an input unit 110 to allow a user to input the operation of the washing machine and a display unit 170 to display the operation state of the washing machine, which will be described below with reference to FIG. 2.

Figure 2:
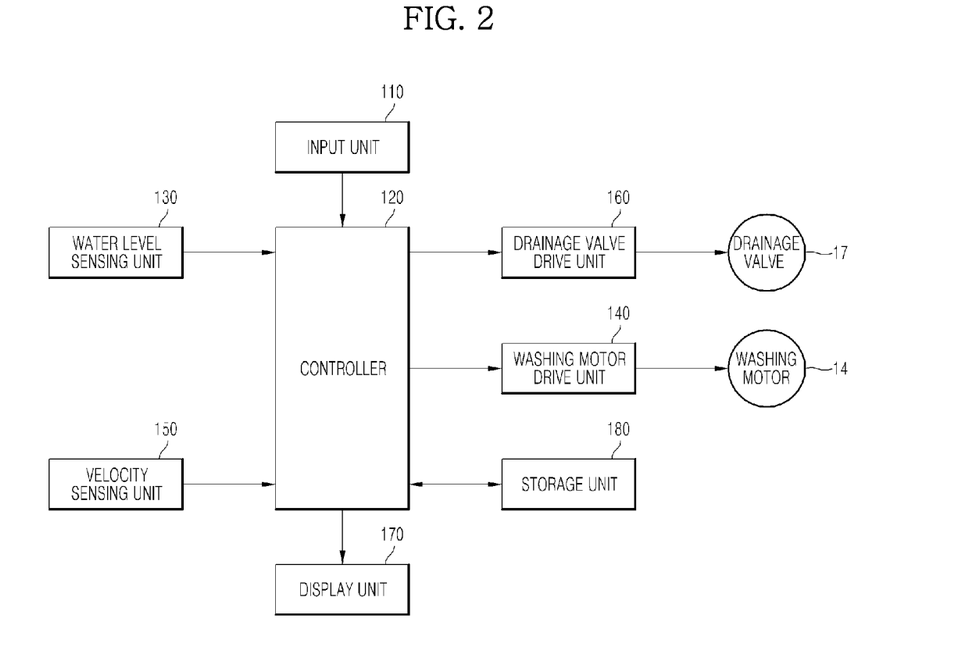
FIG. 2 is a control block diagram of the washing machine according to the embodiment.

FIG. 2 is a control block diagram of the washing machine according to the embodiment. In a control aspect, the washing machine includes an input unit 110, a controller 120, a water level sensing unit 130, a washing motor drive unit 140, a velocity sensing unit 150, a drainage valve drive unit 160, a display unit 170, and a storage unit 180.

The input unit 110 allows a user to input the operation of the washing machine. When the user inputs an operation course and start of the operation, suspension of the operation, or stop of the operation, the input unit 110 transmits an input signal to the controller 120.

The controller 120 analyzes the signal transmitted from the input unit 110 and controls an operation corresponding to the signal to be performed. When a washing or rinsing operation is completed, the controller 120 controls the drainage valve 17 to discharge water from the water tub 11 and the rotary tub 12 to the outside, and transmits a drive signal of the washing motor 14 to the washing motor drive unit 160 such that the rotary tub 12 and the pulsator 13 are rotated by the rotation of the washing motor to perform a spin-drying operation.

At this time, when the rotational velocity of the washing motor 14 is not greater than a spin-drying velocity during the spin-drying operation, the controller 120 determines a command value applied to the washing motor 14, and compares the determined command value with a limit value to determine whether the washing motor 14 is overloaded. When the command value of the washing motor 14 is not less than the limit value, the controller 120 determines that the washing motor 14 is overloaded, stops the rotation of the washing motor 14, and analyzes the cause of the overload.

The cause of the overload applied to the washing motor 14 may be a water filling state in which water separated from laundry during the spin-drying operation is not drained by a centrifugal force of the rotary tub with the result that the water is placed between the water tub 11 and the rotary tub 12, a drainage error state in which water is placed between the water tub 11 and the rotary tub 12 due to the clogging of the drainage pipe 19, or an excessive bubble state in which a large number of bubbles are generated and placed between the water tub 11 and the rotary tub 12. The rotation of the rotary tub 12 is obstructed due to any one of the above-specified causes, and therefore, the washing motor 14 is overloaded. As a result, the rotational velocity of the washing motor 14 does not rise to the spin-drying velocity although the first command value of the washing motor 14 reaches the limit value.

That is, when the rotational velocity of the washing motor 14 does not reach the spin-drying velocity during the spin-drying operation, and when the first command value of the washing motor 14 is not less than the limit value, the controller 120 compares the water level of the water tub 11 transmitted from the water level sensing unit 130 with a reference water level to determine whether the water level of the water tub 11 is the reference water level. At this time, the controller 120 measures time taken until the water level of the water tub 11 has reached the reference water level. When the measured time is not less than a reference time, the controller 120 determines that the cause of the overload is the drainage error state. When the measured time is less than the reference time, the controller 120 determines that the cause of the overload is the water filling state or the excessive bubble state.

To determine whether the cause of the overload is the water filling state or the excessive bubble state, the controller 120 controls the spin-drying operation to be re-performed. At this time, the controller 120 re-determines a command value applied to the washing motor 14, and compares the second command value with the limit value. When the second command value is less than the limit value, the controller 120 determines that the cause of the overload is the water filling state. When the second command value is not less than the limit value, the controller 120 determines that the cause of the overload is the excessive bubble state. In this case, the controller 120 controls a rinsing operation to be performed.

The first and second command values are control values of the washing motor 14 applied to the washing motor 14 to increase the rotational velocity of the washing motor 14 to the spin-drying velocity. The limit value is a determination value to sense overload of the washing motor 14 during the spin-drying operation. Values proportional to torque (PD data) are used as the command values and the limit value.

The water level sensing unit 130 senses the water level of the water tub 11, when the washing motor 14 is stopped, during the spin-drying operation, and transmits the sensed water level of the water tub 11 to the controller 120. The washing motor drive unit 140 transmits a drive signal corresponding to the command value transmitted from the controller 120 to the washing motor 14 to rotate the washing motor 14. The velocity sensing unit 150 senses the rotational velocity of the washing motor 14 during the spin-drying operation, and transmits the sensed rotational velocity of the washing motor 14 to the controller 120. The drainage valve drive unit 160 turns the drainage valve 17 on, during the spin-drying operation, to discharge water from the water tub 11 and the rotary tub 12 to the outside through the drainage pipe 19. The display unit 170 displays the drainage error state, the excessive bubble state, or the addition of rinsing according to a command of the controller 120. The storage unit 180 stores the limit value to determine the cause of the overload applied to the washing motor 14, the reference time, the reference water level, the spin-drying velocity, and a reference number of times of rinsing operations to be further performed.

Figure 3:
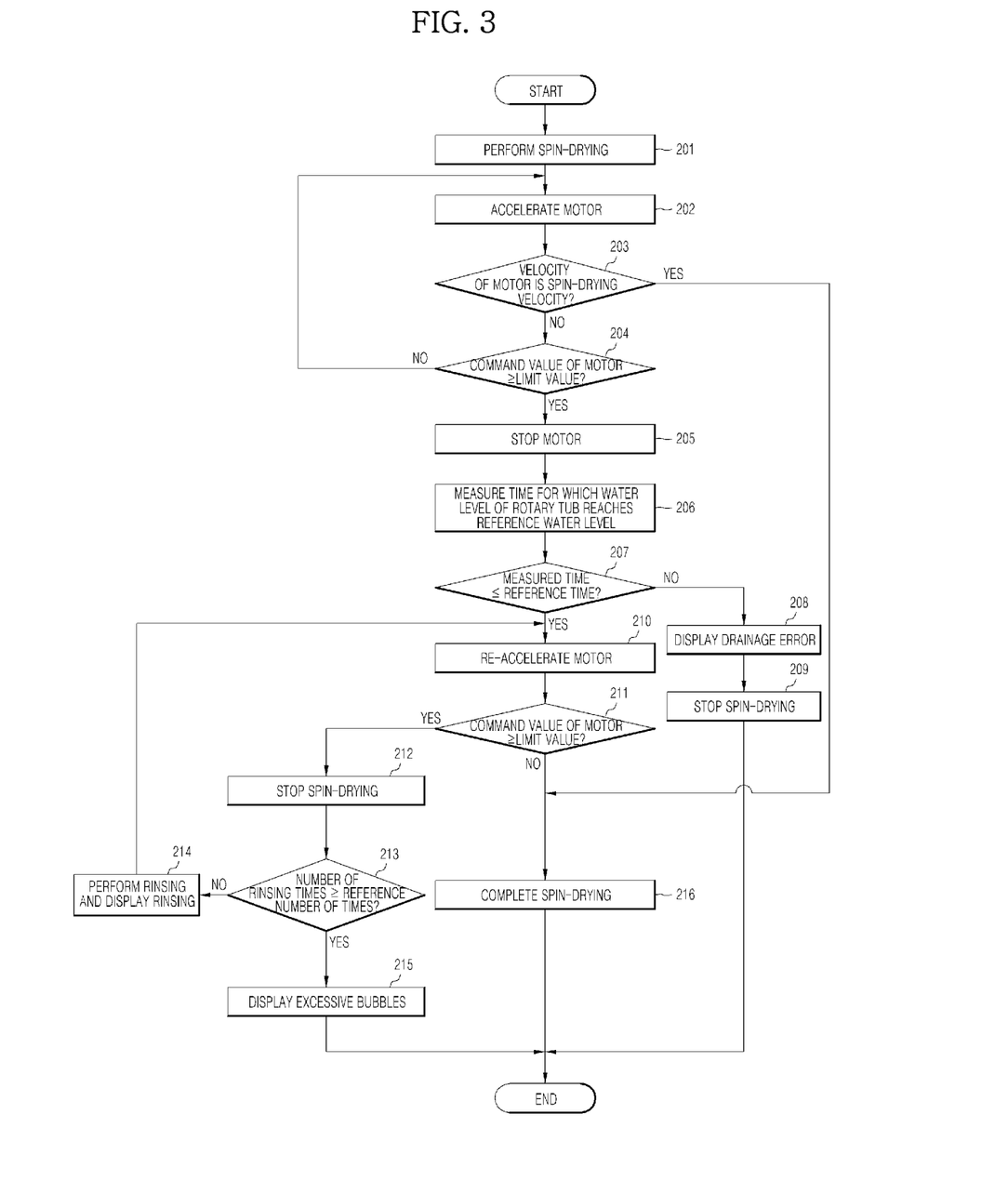
FIG. 3 is a control flow chart of the washing machine according to the embodiment.

FIG. 3 is a control flow chart of the washing machine according to the embodiment. The control method of the washing machine will be described with reference to FIGS. 1 and 2.

When a user puts laundry in the rotary tub 12 and detergent in the detergent supply unit, and inputs an operation course of the washing machine using the input unit 110, an operation corresponding to the input operation course is performed.

First, the washing motor 14 is rotated in alternating directions, while the stirring shaft 15 and the tub shaft 16 are disengaged from each other, such that the pulsator 13 performs stirring in alternating directions, the weight of the laundry is sensed based on the rotational velocity or rotary force of the washing motor 14 due to the stirring operation of the pulsator 13, and water necessary for washing and rinsing operations is supplied from the water supply unit based on the sensed weight of the laundry.

Also, the washing motor 14 is rotated in alternating directions, while the stirring shaft 15 and the tub shaft 16 are disengaged from each other, such that the pulsator 13 performs stirring in alternating directions to create a water current in the rotary tub 12. Using the water current, wetting of laundry placed in the rotary tub 12 and a washing operation are performed, or a rinsing operation is performed.

When the washing operation or the rinsing operation is completed, the rotation of the washing motor 14 is stopped, and the drainage valve 17 is turned on to discharge the water from the water tub 11 and the rotary tub 12 to the outside. When the drainage operation is completed, the washing motor 14 is rotated in the forward direction or in the reverse direction, while the stirring shaft 15 and the tub shaft 16 are engaged with each other, to perform spin-drying (201).

During the spin-drying, the washing motor 14 is accelerated (202) to a spin-drying velocity (about 800 rpm). At this time, the rotational velocity of the washing motor 14 is sensed by the velocity sensing unit 150. The sensed rotational velocity of the washing motor 14 is compared with the spin-drying velocity (203). When the rotational velocity of the washing motor 14 is not less than the spin-drying velocity, it is determined that the spin-drying operation is normally performed, and the spin-drying operation is completed (216).

On the other hand, when the rotational velocity of the washing motor 14 is less than the spin-drying velocity, it is determined that the washing motor 14 is overloaded, and the cause of the overload by which the washing motor is not accelerated to the spin-drying velocity is determined.

Alternatively, when the rotational velocity of the washing motor 14 is less than the spin-drying velocity, it is determined whether a predetermined time from the point of time when the spin-drying starts has elapsed. When the predetermined time from the point of time when the spin-drying starts has elapsed, it is determined that the washing motor 14 is overloaded, with the result that the washing motor 14 is not accelerated to the spin-drying velocity, and the cause of the overload is determined.

To this end, when the rotational velocity of the washing motor 14 is less than the spin-drying velocity, a first command value applied to the washing motor 14 is determined, and the first command value is compared with a limit value (204). When the first command value is not less than the limit value, it is determined that the washing motor 14 is overloaded, with the result that the washing motor 14 is not accelerated to the spin-drying velocity, and the cause of the overload is determined.

When the rotational velocity of the washing motor 14 is less than the spin-drying velocity, and, when the first command value is less than the limit value, it is determined that the washing motor 14 is not overloaded, and the rotational velocity of the washing motor 14 is increased, while increasing the command value applied to the washing motor 14 to the limit value, to complete the spin-drying operation (216).

The washing motor 14 is overloaded because the rotation of the rotary tub 12 is obstructed. The cause of obstruction of the rotation of the rotary tub 12 may be a drainage error state in which water is placed between the water tub 11 and the rotary tub 12 due to the clogging of the drainage pipe 19, a water filling state in which water separated from laundry having high water content is not discharged to the outside with the increase of the rotational velocity with the result that the water is placed between the water tub 11 and the rotary tub 12 by a centrifugal force of the rotary tub 12, or an excessive bubble state in which excessive detergent is supplied or the rinsing of the laundry is poorly performed, with the result that bubbles are placed between the water tub 11 and the rotary tub 12. The following process is performed to determine one of the causes of the overload applied to the washing motor 14.

That is, when the rotational velocity of the washing motor 14 is less than the spin-drying velocity, and when the first command value applied to the washing motor 14 is not less than the limit value, the driving of the washing motor is stopped for a predetermined time (205), and time for which the water level of the water tub 11 reaches a reference water level is measured (206). At this time, it may also be possible to measure time for which the water level of the rotary tub 12 reaches the reference water level.

The measured time is compared with the reference time (207). When the measured time is not less than the reference time, it is determined that the cause of the overload is the drainage error state, the drainage error is displayed through the display unit 170 (208), and the spin-drying is stopped (209). By displaying the drainage error message on the display unit at the time of the drainage error, it may be possible to inform a consumer of the drainage error state.

When the measured time is less than the reference time, it is determined that the cause of the overload is the water filling state or the excessive bubble state. To determine whether the cause of the overload applied to the washing motor 14 is the water filling state or the excessive bubble state, not the drainage error state, the following process is performed.

When the time for which the water level of the water tub 11 reaches the reference water level is less than the reference time, the washing motor 14 is driven to re-perform the spin-drying operation. At this time, the washing motor 14 is accelerated to the spin-drying velocity (210), the rotational velocity of the accelerated washing motor 14 is sensed, and the sensed rotational velocity is compared with the spin-drying velocity. When the rotational velocity of the washing motor 14 is less than the spin-drying velocity, the command value is increased, and the increased command value is applied to the washing motor 14 to increase the rotational velocity of the washing motor 14.

At this time, when the rotational velocity of the washing motor 14 is less than the spin-drying velocity, a second command value applied to the washing motor 14 is determined, and the second command value is compared with the limit value (211). When the second command value is less than the limit value, it is determined that the cause of the overload is the water filling state, and the spin-drying operation is continuously performed and completed (216).

The reason that the second command value is less than the limit value in the water filling state is that a centrifugal force generated by the rotation of the rotary tub 12 is eliminated when the washing motor 14 is stopped after the overload is applied to the washing motor 14 for the first time, with the result that the water filling the space between the water tub 11 and the rotary tub 12 is discharged to the outside through the drainage pipe 19 for the reference time, whereby no overload is applied to the washing motor 14 when the washing motor 14 is re-rotated to re-perform the spin-drying operation.

When the second command value is not less than the limit value, it is determined that the cause of the overload is the excessive bubble state, the rotation of the washing motor 14 is stopped to stop the spin-drying (212), the addition of a rinsing operation due to the excessive bubbles is displayed through the display unit 170, and the rinsing operation is performed (214).

When the rinsing operation is completed, a drainage operation is performed. When the drainage operation is completed, a spin-drying operation is performed. During the spin-drying operation, the washing motor 14 is accelerated to the spin-drying velocity, the rotational velocity of the accelerated washing motor 14 is sensed, and the sensed rotational velocity is compared with the spin-drying velocity. When the rotational velocity of the washing motor 14 is less than the spin-drying velocity, the command value is increased, and the increased command value is applied to the washing motor 14 to increase the rotational velocity of the washing motor 14. At this time, when the rotational velocity of the washing motor 14 is less than the spin-drying velocity, a third command value applied to the washing motor 14 is compared with the limit value. When the third command value is less than the limit value, the spin-drying operation is continuously performed and completed (216). When the third command value is not less than the limit value, rinsing operations are further performed.

At this time, the number of times that the rinsing operation has been performed is compared with a reference number (213) such that the rinsing operations are performed less than the reference number (about 5 times). When the number of times that the rinsing operation has been performed is not less than the reference number, the excessive bubble error is displayed through the display unit 170 (215).

Consequently, the spin-drying operation is re-performed to normally complete the spin-drying in the water filling state. When excessive bubbles are generated, the excessive bubble state is determined, and a rinsing or spin-drying operation is added to remove the bubbles or to display the excessive bubble message on the display unit to inform a consumer of the excessive bubble state.

As is apparent from the above description, an embodiment of the present invention may determine the water filling state, the excessive bubble state, or the drainage error state, which may be caused during the spin-drying operation, and taking a proper measure. That is, in the drainage error state, it may be possible to inform a user of the drainage error. In the water filling state, it may be possible to normally complete the spin-drying by re-performing the spin-drying operation. In the excessive bubble state, it may be possible to add the rinsing or spin-drying operation to remove the bubbles. When the bubbles are not removed by the added rinsing or spin-drying operation, it may be possible to display the excessive bubble message to inform a consumer of the excessive bubble state.

Also, it may be possible to prevent the washing motor from being overloaded, during the spin-drying operation, by the water placed between the rotary tub and the water tub of the washing machine by taking a proper measure. Consequently, it may be possible to accelerate the washing motor to the spin-drying velocity to improve spin-drying efficiency.

Also, it may be possible to prevent overcurrent from being generated by the water placed between the rotary tub and the water tub of the washing machine, thereby preventing the washing motor from burning out and thus causing the washing machine to break down. Consequently, it may be possible to improve a consumer confidence.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A washing machine comprising:
   a water tub;
   a rotary tub rotatably installed in the water tub;
   a drainage unit to discharge water from the water tub and the rotary tub to an outside;
   a motor to rotate the rotary tub;
   a velocity sensing unit to sense rotational velocity of the motor; and
   a controller to control the motor to rotate the rotary tub to perform a spin drying,
   wherein when a rotational velocity of the motor is less than a spin-drying velocity during the spin drying, the controller is configured to determine a command value applied to the motor, to compare the determined command value with a predetermined limit value, and to determine the motor is overloaded when the determined command value of the motor is more than the predetermined limit value during the spin-drying,
   wherein the controller is configured to stop the spin drying to determine a cause of the overload when the motor is overloaded,
   wherein the controller is configured to determine a drainage error has occurred when water is discharged from the water tub while the spin drying is stopped, and
   wherein the controller is configured to re-start the spin drying when a drainage error has not occurred, to re-determine the command value of the motor, to compare the re-determined command value with the predetermined limit value, and to determine a water filling has occurred when the re-determined command value is less than the predetermined limit value.

2. The washing machine according to claim 1, further comprising a water level sensing unit to sense a water level of the rotary tub,
   wherein the controller is configured to measure time for which the water level of the rotary tub reaches a reference water level while the spin drying is stopped, and compare the measured time with a reference time to determine the cause of the overload is the drainage error.

3. The washing machine according to claim 2, wherein, when the re-determined command value is not less than the predetermined limit value, the controller is configured to determine that the cause of the overload is a bubble generation and to control a rinsing operation to be performed.

4. The washing machine according to claim 1, further comprising a display unit to display the cause of the overload.

* * * * *